(12) United States Patent
Yokoyama

(10) Patent No.: US 6,710,591 B2
(45) Date of Patent: Mar. 23, 2004

(54) METHOD AND SYSTEM FOR MEASURING ANCHORING STRENGTH OF LIQUID CRYSTAL BY MEASURING MAGNETIC FIELD INDUCED TORQUE

(75) Inventor: Hiroshi Yokoyama, Tsukuba (JP)

(73) Assignee: Japan Science and Technology Corporation, Kawaguchi (JP)

( * ) Notice: Subject to any disclaimer, the term of this patent is extended or adjusted under 35 U.S.C. 154(b) by 0 days.

(21) Appl. No.: 10/276,303

(22) PCT Filed: Sep. 28, 2001

(86) PCT No.: PCT/JP01/08504

§ 371 (c)(1),
(2), (4) Date: Apr. 9, 2003

(65) Prior Publication Data

US 2003/0150278 A1 Aug. 14, 2003

(30) Foreign Application Priority Data

Mar. 22, 2001 (JP) ........................................ 2001-082770

(51) Int. Cl.[7] ........................ G01N 27/72; G01N 27/74; G01R 33/12
(52) U.S. Cl. ........................ 324/204; 324/228; 324/261; 324/262; 324/770
(58) Field of Search ............................. 324/204, 228, 324/261, 262, 71.1, 770; 252/299.01; 349/23

(56) References Cited

U.S. PATENT DOCUMENTS

| | | | | |
|---|---|---|---|---|
| 4,965,518 A | * | 10/1990 | Agarwala | 324/228 |
| 5,427,713 A | * | 6/1995 | Wartenberg et al. | 252/299.5 |
| 5,571,448 A | * | 11/1996 | Wartenberg et al. | 252/299.5 |
| 6,242,060 B1 | * | 6/2001 | Yoneya et al. | 428/1.23 |

FOREIGN PATENT DOCUMENTS

JP 10-246693 9/1998

OTHER PUBLICATIONS

Hiroshi Yokoyama Ekisho, vol. 4, No. 1, pp. 63–72 2000.
Takashi Sugiyama et al.: "A simple model for pretilted nematic liquid crystal medium and its torsional surface coupling strength" Japanese Journal of Applied Physics, vol. 29, No. 10, pp. 2045–2051 10/90.
Hiroshi Yokoyama Ekisho, vol. 3, No. 1, pp. 25–33 1999.
H. Yokoyama: "Surface anchoring of nematic liquid crystals" Mol. Cryst. Liq. Cryst., vol. 165, pp. 265–316 1988.
H. Yokoyama: "A novel method for determining the anchoring energy function at a nematic liquid crystal–wall interface from director distortions at high fields" J. Appl. Phys., vol. 57, No. 10, pp. 4520–4526 May 15, 1985.

* cited by examiner

Primary Examiner—Gerard R. Strecker
(74) Attorney, Agent, or Firm—Oblon, Spivak, McClelland, Maier & Neustadt, P.C.

(57) ABSTRACT

A method and system for measuring anchoring strength of liquid crystal through measurement of magnetic field induced torque. In the system for measuring anchoring strength of liquid crystal, when a magnetic field (7) is applied to a liquid crystal cell (1), a torsion wire (5) twists in response to the magnetic field (7) As a result, a mirror (6) attached to the torsion wire (5) displaces, and thus a laser beam emitted from a laser (8) and reflected from the mirror (6) rotates. The displacement of the laser beam is detected by a bisected photodiode (9) for position detection. Specifically, outputs from the bisected photodiode (9) are amplified by means of amplifiers (10) and (11), which output voltages $V_A$ and $V_B$, respectively. The magnetic-field induced torque is proportional to the rotational angle of the mirror, which is proportional to $V_A$-$V_B$. Therefore, the magnetic-field-induced torque can be obtained on the basis of the rotational angle of the mirror to thereby measure the strength of anchoring of liquid crystal.

4 Claims, 3 Drawing Sheets

F I G. 1
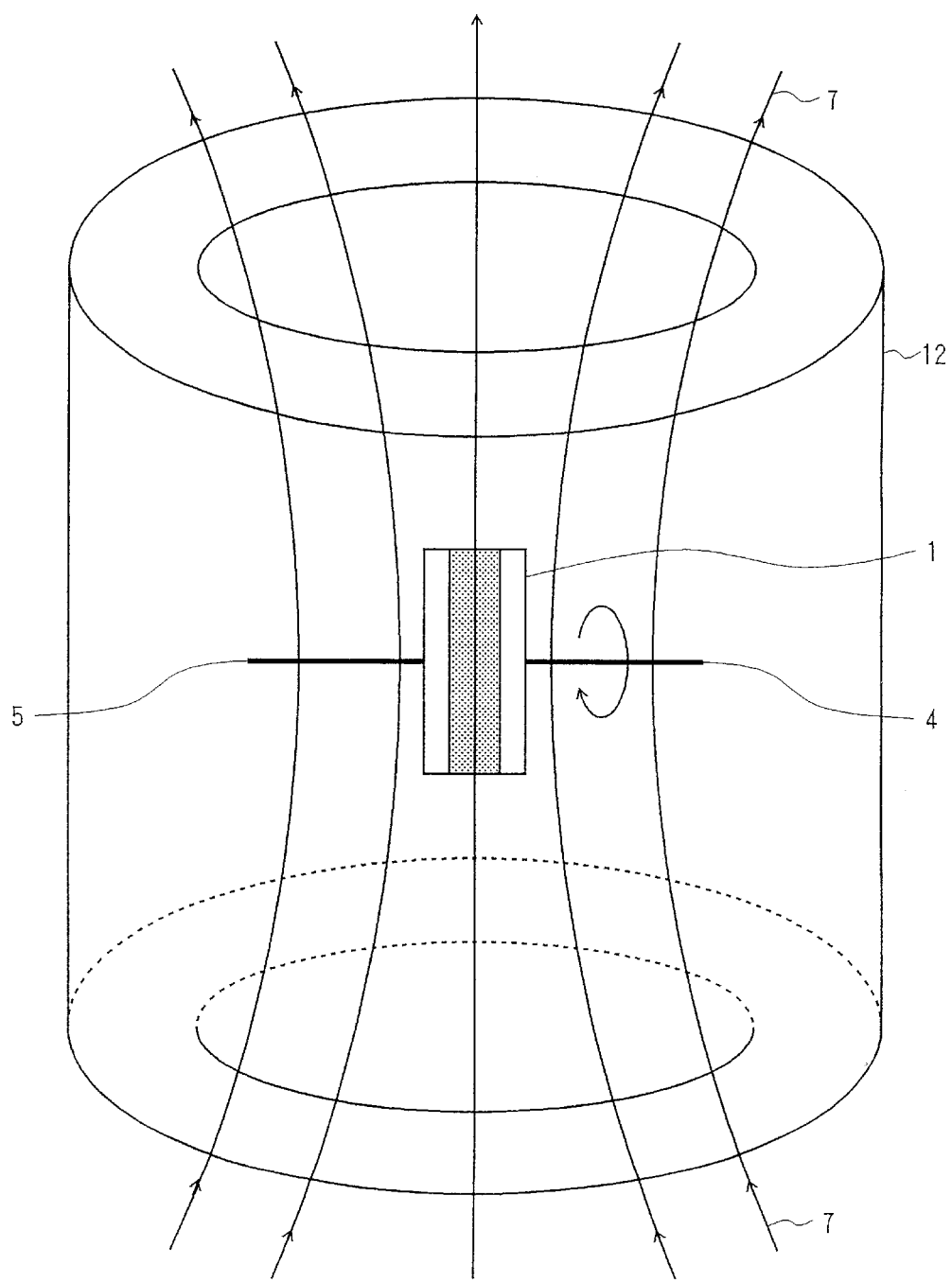

F I G. 2
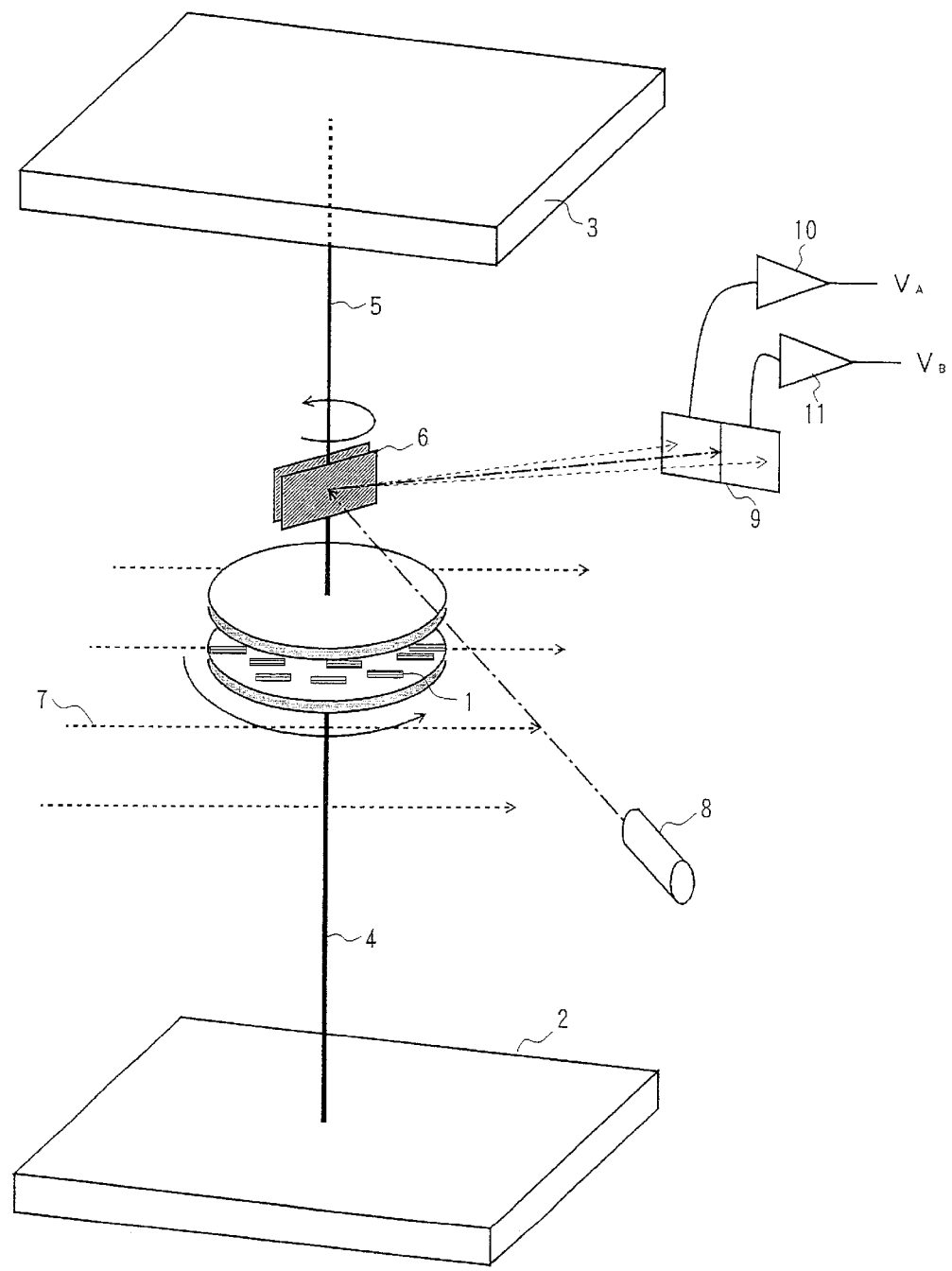

METHOD AND SYSTEM FOR MEASURING ANCHORING STRENGTH OF LIQUID CRYSTAL BY MEASURING MAGNETIC FIELD INDUCED TORQUE

TECHNICAL FIELD

The present invention relates to a method for measuring anchoring strength of liquid crystal and to a measurement system therefor.

BACKGROUND ART

Literature in relation to this technical field includes the following.
(1) Hiroshi Yokoyama, "Principle and Practical Method for Measuring Interface Anchoring Strength: Focused on Strong Electric-Field Method," Liquid Crystal, 4, 63 (2000).
(2) Hiroshi Yokoyama, "Thermodynamics of Interface Anchoring of Liquid Crystal," Liquid Crystal, 3, 25 (1999).
(3) H. Yokoyama: Mol. Cryst. Liq. Cryst., 165, 265 (1988).
(4) H. Yokoyama and H. A. van Sprang: J. Appl. Phys., 57, 4520 (1985).

Anchoring at a substrate-liquid crystal interface is determined by three anchoring energy coefficients defined by the following expression (1):

$$\Delta\gamma = \frac{1}{2}W_p\delta\theta^2 + \frac{1}{2}W_a\delta\phi^2 + W_{pa}\delta\theta\delta\phi \tag{1}$$

where $\theta$ is a zenith angle that a director forms with respect to the substrate normal line (z axis), $\phi$ is an azimuth angle, and $\gamma$ is interface free energy (see the above-mentioned literature (1) and (2)).

Over the years, there have been developed methods for measuring anchoring energy, which affects the photoelectric response of liquid crystal and which is the most fundamental physical property of orientation film (see the above-mentioned literature (3) and (4)).

For measurement of strength of zenith angle anchoring, a strong electric-field method utilizing the scaling law of Frank elasticity has been developed. This method enables highly accurate extraction of characteristics of interface anchoring without being affected by bulk characteristics such as elastic constant and dielectric constant.

The strong electric-field method is used for nematic liquid crystal having a positive dielectric anisotropy. In this method, a vertical electric field is applied to a cell; and an optical retardation R that remains in the vicinity of the substrate interface at that time is measured as a function of voltage in a high voltage region where voltage is greater than the Freedericksz transition voltage.

The retardation R is the total sum of contributions from individual points; i.e., is represented by the following expression:

$$R = \frac{2\pi}{\lambda}\int_0^\infty \Delta n_{eff}(\theta)\,dz \tag{2}$$

where $\lambda$ is the wavelength of light, and $\Delta n_{eff}(\theta)$ is effective birefringence of light at the respective point.

DISCLOSURE OF THE INVENTION

According to the theory of elasticity, in general, there holds the scaling law in which not only retardation, but also other summable physical property values change in proportion to the reciprocal of the density of electric flux applied to a cell.

Moreover, in bulk, liquid crystal is oriented along the direction of an electric field, and no retardation is generated for a light ray passing through the liquid crystal in parallel to the electric field (R→ for V→∞). The strong electric-field method is based on these two characteristics.

Meanwhile, for azimuth angle anchoring, no summable physical property which automatically vanishes at the limit of a strong electric field is known. Therefore, the strong electric-field method cannot be applied to azimuth angle anchoring as is. Therefore, at present, there are used only several easier methods in which influences of bulk are removed through comparison with simulation results.

Further, in the case of zenith angle anchoring as well, there exist various factors which hinder R→0, such as discrepancy between a light ray and an electric field and a residual retardation of the substrate; and for strong anchoring their influences cannot be ignored.

An object of the present invention is to provide a method for measuring anchoring strength of liquid crystal through measurement of magnetic-field-induced torque, which, unlike conventional methods such as the strong electric-field method, uses a strong magnetic field, is therefore based on a clear principle, does not require bias correction, and enables measurement for liquid crystal of an arbitrary shape, as well as a measurement system for the measuring method.

To achieve the above object, the present invention provides the following.

[1] A method for measuring anchoring strength of liquid crystal, characterized by applying a strong magnetic field to a liquid crystal cell, and measuring magnetic-field-induced torque to thereby measure the anchoring strength of liquid crystal.

[2] The method for measuring anchoring strength of liquid crystal as described above in [1], wherein the strong magnetic field is about 10 T.

[3] A system for measuring anchoring strength of liquid crystal, characterized by comprising an optical system for radiating light onto a liquid crystal cell; means for applying a strong magnetic field to the liquid crystal cell; and means for measuring magnetic-field-induced torque.

[4] The system for measuring anchoring strength of liquid crystal as described above in [3], further comprising means for adjusting the angle of the liquid crystal cell.

BRIEF DESCRIPTION OF THE DRAWINGS

FIG. 1 is a schematic diagram of a main portion of a system for measuring anchoring strength of liquid crystal according to an embodiment of the present invention.

FIG. 2 is a view showing the configuration of the system for measuring anchoring strength of liquid crystal according to the embodiment of the present invention.

BEST MODE FOR CARRYING OUT THE INVENTION

An embodiment of the present invention will next be described in detail with reference to the drawings.

FIG. 1 is a schematic diagram of a main portion of a system for measuring anchoring strength of liquid crystal according to an embodiment of the present invention; FIG. 2 is a view showing the configuration of the system for measuring anchoring strength of liquid crystal; and FIG. 3 is a diagram relating to the embodiment of the present invention and showing interface torque induced by a magnetic field.

Figure 3:
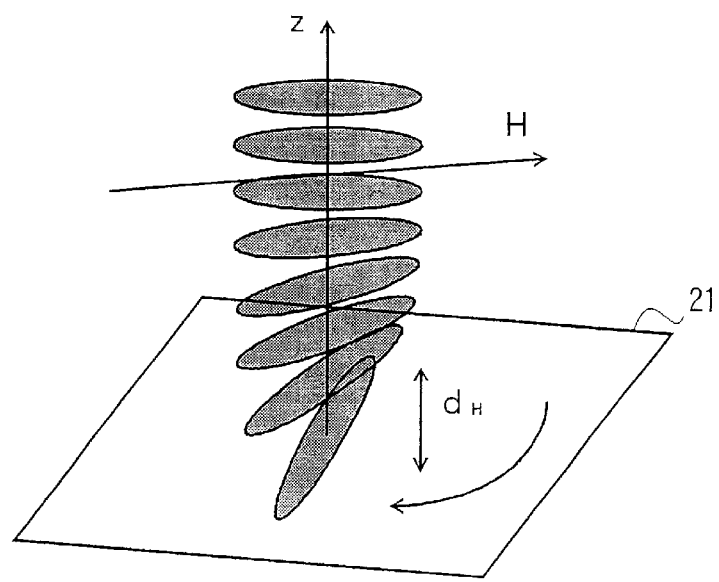
FIG. 3 is a diagram relating to the embodiment of the present invention and showing interface torque induced by a magnetic field.

In FIGS. 1 to 3, reference numeral 1 denotes a liquid crystal cell; reference numerals 2 and 3 denote fixing bases; reference numerals 4 and 5 denote torsion wires; reference numeral 6 denotes a mirror; reference numeral 7 denotes a magnetic field; reference numeral 8 denotes a laser; reference numeral 9 denotes a bisected photodiode for position detection; reference numerals 10 and 11 denote amplifiers; reference letters $V_A$ and $V_B$ denote output voltages; reference numeral 12 denotes a superconductive magnet; and reference numeral 21 denotes a substrate.

When the magnetic field 7 is applied to the liquid crystal cell 1, the torsion wire 5 twists in response to the magnetic field 7. As a result, the mirror 6 attached to the torsion wire 5 displaces, and thus the laser beam emitted from the laser 8 and reflected from the mirror 6 rotates. The displacement of the laser beam is detected by the bisected photodiode 9 for position detection. Specifically, outputs from the bisected photodiode 9 are amplified by means of the amplifiers 10 and 11, which output voltages $V_A$ and $V_B$, respectively. The magnetic-field induced torque is proportional to the rotational angle of the mirror, which is proportional to $V_A$-$V_B$. Therefore, the magnetic-field-induced torque can be obtained on the basis of the rotational angle of the mirror to thereby measure the strength of anchoring of liquid crystal. Thus, a strong magnetic-field method is re-constructed on the basis of the induced torque.

<Measurement of Anchoring Strength on the Basis of Magnetic-field Induced Torque>

The free energy of nematic liquid crystal in the presence of the magnetic field 7 is given as the sum of Frank elastic energy $f_d$, energy of anisotropic interaction with the magnetic field $f_F$, and interface free energy (the following expression (3)).

$$F = \int dS \Delta \gamma(n_d) + \int dv [f_d(r) + f_F(r)] \quad (3)$$

The energy of anisotropic interaction with the magnetic field can be represented as follows by use of anisotropy of magnetic sensitivity $\Delta x = x \| - x \perp$ and director n:

$$f_F = -\frac{1}{2} \mu_0 \Delta x (n \cdot H)^2 \quad (4)$$

where $\mu_0 = 4\pi \times 10^{-7}$.

Here, assume a state in which the orientation changes along the normal of the substrate 21, as shown in FIG. 3. In this case, as in the discussion regarding the ordinary strong magnetic field method, due to the scaling law of Frank elasticity, a certain universal function $N(\xi)$ is present, and director distribution can be expressed by $n(z) = N[H(z+d_e)]$, where $d_e$ is an extrapolation distance K/W. Next, torque $\Gamma = \mu_0 \Delta x (n \cdot H) n \times H$ will be considered. Clearly, when $H \to \infty$, $\Gamma \to 0$. The torque T acting the entire substrate can be represented as follows:

$$\frac{T}{H^2} = \int H^{-2} \mu_0 \Delta x (n \cdot H) n \times H dz ds \quad (5)$$

$$\approx \frac{S}{H} \int \mu_0 \Delta x (N \cdot h) N \times h d\xi -$$

$$S \mu_0 \Delta x (n_e \cdot h) n_e \times h d_e$$

where $n_e$ is an easy direction on the surface of the substrate 21, and h=H/H is a unit vector in the magnetic field direction.

Figure 4:
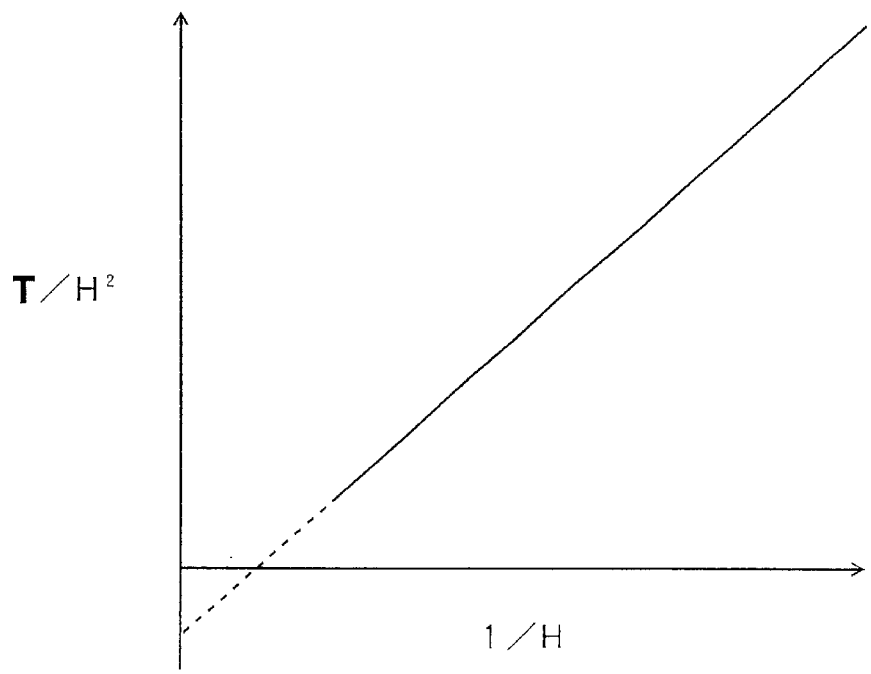
FIG. 4 is a graph showing relation between magnetic field strength H and torque T.

Therefore, when variation in $T/H^2$ with 1/H is plotted, as shown in FIG. 4, a straight line is obtained, and the distance between the origin and the intercept represents an anchoring strength.

Since the magnetic field strength H can be applied to the liquid crystal cell along any direction, the above-described result can be universally applied to zenith angle anchoring, azimuth angle anchoring, or a mixture thereof. The magnetic field does not depend on orientation of liquid crystal, because of the low magnetic sensitivity of $10^{-7}$. When this fact is taken into consideration, expression (5) can be considered to hold locally for a liquid crystal sample having an arbitrary shape. The above-described linear relation between torque and reciprocal of magnetic field strength and the above-described relation between torque and anchoring strength hold when expression (5) is replaced with surface integration.

Theoretically, measurement of magnetic-field induced torque by use of a magnetic-field induced torque measurement apparatus can completely solve the problems in relation to measurement of anchoring strength which heretofore have remained unsolved. However, since magnetic sensitivity of liquid crystal is low, practical measurement requires a strong magnetic field of about 10 T.

Therefore, a superconductive coil and a power supply therefor are provided in order to apply a strong magnetic field to the liquid crystal cell.

The present invention is not limited to the above-described embodiment. Numerous modifications and variations of the present invention are possible in light of the spirit of the present invention. In particular, various schemes may be employed for torque measurement, and they are not excluded from the scope of the present invention.

As described in detail above, the present invention can achieve the following effects.

(A) The operation principle is clear (separation between bulk and interface response is possible); bias correction (which is essential in optical measurement) is unnecessary; and measurement can be performed for liquid crystal cells of arbitrary shapes.

(B) A practical measurement system for liquid crystal cells of various dimensions can be constructed by use of a commercially available superconductive magnet and a torque measurement balance or a like element.

Industrial Applicability

The present invention relates to a method for measuring anchoring strength of liquid crystal and a measurement system therefor which can be applied not only to displays but also to optical communications and optical memory systems.

What is claimed is:

1. A method for measuring anchoring strength of liquid crystal, comprising applying a strong magnetic field to a liquid crystal cell to induce a torque acting on the liquid crystal cell, and measuring the magnetic-field-induced torque to thereby measure the anchoring strength of the liquid crystal.

2. A method for measuring anchoring strength of liquid crystal according to claim 1, wherein the strong magnetic field is about 10 T.

3. A system for measuring anchoring strength of liquid crystal, comprising:

(a) means for applying a strong magnetic field to a liquid crystal cell to induce a torque acting on the liquid crystal cell; and (b) means for measuring the magnetic-field-induced torque as a measure of the anchoring strength of the liquid crystal.

4. A system for measuring the anchoring strength of liquid crystal according to claim 3, further comprising means for adjusting the angle of the liquid crystal cell.

* * * * *